No. 649,855. Patented May 15, 1900.
R. T. MARSHALL.
SLAG EJECTOR.
(Application filed Oct. 6, 1899.)
(No Model.)
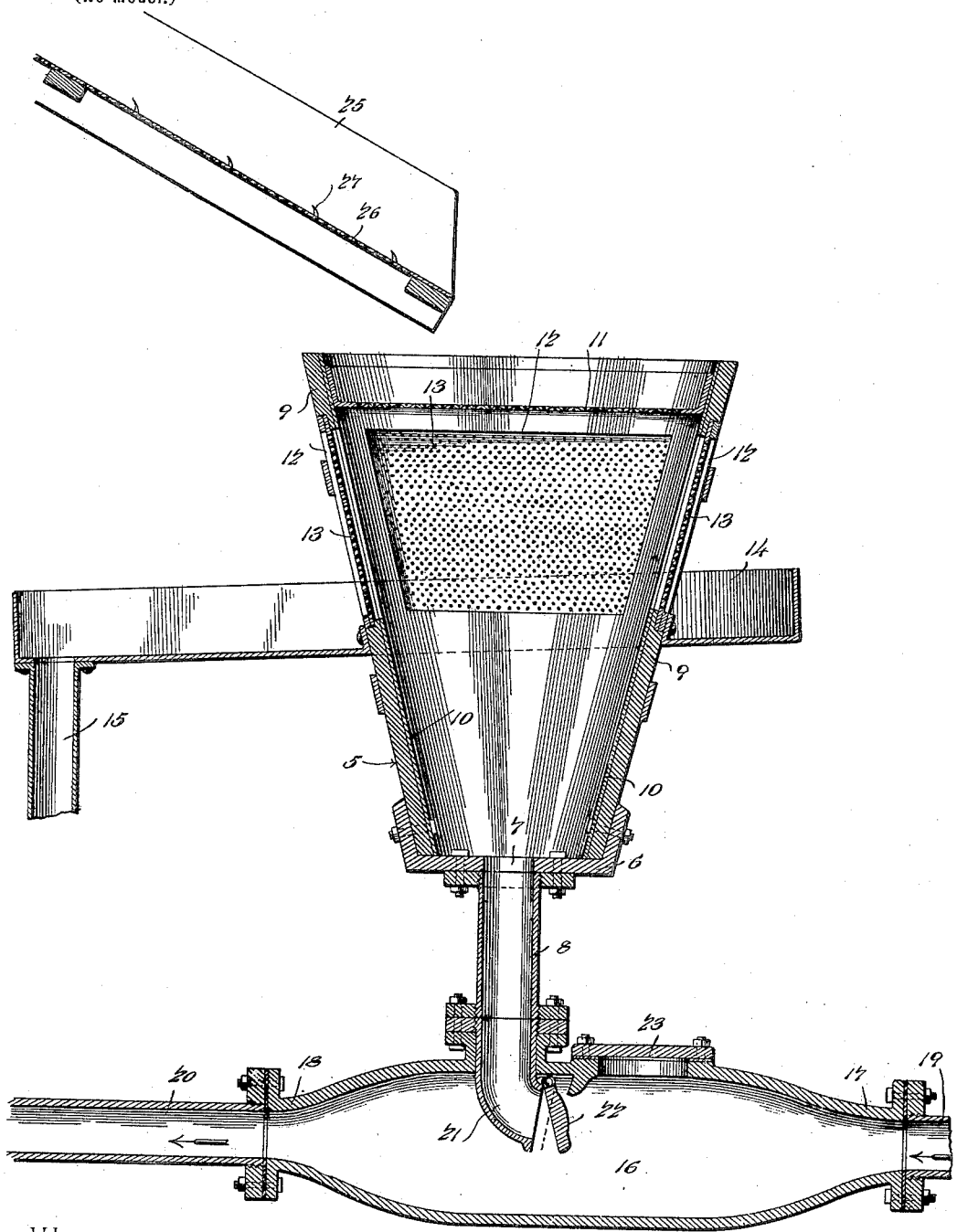
Witnesses
E. F. Stewart
Geo. H. Chandlee
Richard T. Marshall, Inventor
By his Attorneys,
C. A. Snow & Co.

UNITED STATES PATENT OFFICE.

RICHARD TUDOR MARSHALL, OF TOCCOA, GEORGIA.

SLAG-EJECTOR.

SPECIFICATION forming part of Letters Patent No. 649,855, dated May 15, 1900.

Application filed October 6, 1899. Serial No. 732,771. (No model.)

*To all whom it may concern:*

Be it known that I, RICHARD TUDOR MARSHALL, a citizen of the United States, residing at Toccoa, in the county of Habersham and State of Georgia, have invented a new and useful Slag-Ejector, of which the following is a specification.

This invention relates to slag-ejectors, and has for one of its objects to provide a means for carrying away the slag from smelting-furnaces and which slag has been previously wetted to extinguish combustion, although, as will be seen from the following description, it may be employed in conveying ashes or other matter that may be flumed away by water, such as the usual waste materials about a mine.

A further object of the invention is to provide such a construction that the hopper may be automatically discharged when the material therein has accumulated to a predetermined extent.

In the drawing forming a portion of this specification there is shown in section an ejecting mechanism constructed in accordance with this invention.

Referring now to the drawing, 5 represents a hopper, comprising a base portion 6, which is preferably cast of iron and is pan-shaped and has a central perforation 7 in its bottom, with which is connected a discharge-pipe 8. The hopper proper is preferably frusto-conical in form and consists of sides 9, the lower ends of which are disposed within the base 6, to the sides of which they are firmly bolted, as shown. These sides have a metallic lining 10, and adjacent the upper end of the hopper is arranged a transverse screen 11. In the sides of the hopper and just below the screen 11 are formed truncated triangular openings 12, provided with screens 13, and surrounding the hopper, just below the screens 13, is a tilted trough 14, having a drain-pipe 15 at its lower end. Arranged below the discharge-pipe 8 and at right angles thereto is a cylindrical chamber 16, having reduced ends 17 and 18, and connected with the end 17 is a water-supply pipe 19 and with the end 18 a waste-pipe 20. Leading into the chamber 16 is a pipe 21, having its lower end turned in the direction of the supply-pipe 19 and provided with a hinged cover or valve 22, the hinge of which is at the upper edge, so that the pressure of water against the valve in the passage of the water through the chamber 16 will tend to hold the valve closed. This pipe 21 is connected directly with the pipe 8, as shown, and the chamber 16 is provided with a handhole 23, having a suitable cover and allowing access to the chamber 16 and the mechanism therein.

A chute 25 has its discharge end above the hopper to deliver upon the screen 11, and this chute comprises imperforate sides and a perforated or screen bottom 26, having transverse riffles 27.

In practice the slag, which has been previously wetted to extinguish all combustion, is shoveled into the trough 25, passes downwardly through the trough in a wet state, and tends to lodge against the riffles, and thus its movement will be retarded and permit the water to drain through the bottom 26, the waste product thus passing from the trough or chute onto the screen 11 in a more or less dry condition. Those portions of the waste that are sufficiently divided pass through the screen 11 and into the bottom of the hopper, the larger portions, which would interfere with the operation of the mechanism, remaining upon the screen and from which they may be removed. At this time water is passing through the pipes 19 and 20 and the chamber 16 and exerts a pressure upon the valve 22 sufficient to hold it closed. When the material within the hopper reaches a height above the lower edges of the screens 13, the moisture of the material above the screens will run out through the screens and through the trough 14, and when the material within the hopper has reached that height where its pressure upon the inner face of the valve 22 is greater than the water-pressure against the outer face of the valve the valve will be open and the material will pass downwardly and into the chamber 16, from which it will be conveyed through the contracted end 18 and pipe 20 to the deposit. When that amount of material has passed from the hopper to bring the pressure in the pipe 8 against the valve below the water-pressure, the valve will close, and thus will the valve be automatically operated intermittently to permit filling of the hopper and to insure the discharge therefrom.

It will of course be understood that this mechanism may be employed for any purpose to which it is adapted, that the particular shape of the hopper may be varied, and that other modifications may be made and that any desired proportions and materials may be used without departing from the spirit of the invention.

Having thus described the invention, what is claimed as new is—

1. A slag-ejector comprising a chamber having water inlet and outlet passages and a hopper having a discharge-pipe extending into the chamber and provided with a valve adapted to open in the direction of the inlet-passage of the chamber to be held normally seated by the water therefrom.

2. A slag-ejector comprising a chamber having an inlet and an outlet water-passage and a hopper having a discharge-pipe opening into the chamber and provided with an outlet-valve adapted to be closed and held closed by the pressure in the chamber, and adapted to be opened against such pressure.

3. A slag-ejector comprising a chamber having contracted ends, an inlet water-pipe connected with one end of the chamber, a waste-pipe connected with the other end of the chamber, a hopper provided with a discharge-pipe entering the chamber and a valve carried by the discharge-pipe and opening against the pressure within the chamber under the influence of pressure within the discharge-pipe.

4. A slag-ejector comprising a chamber having an inlet and an outlet water-passage, a hopper having a discharge-pipe opening into the chamber and provided with an outlet-valve adapted to be closed and held closed by the pressure within the chamber and to be opened against such pressure, screened openings in the sides of the hopper and a trough connected with the hopper and adapted to receive the discharge through said screens.

5. A slag-ejector comprising a chamber having an inlet and an outlet opening for the passage of water, a hopper having an outlet-pipe opening into the chamber and provided with an outlet-valve adapted to open against the pressure within the chamber, screens in the sides of the hopper, a trough connected with the hopper and adapted to receive the discharge through the screens, a screen across the upper end of the hopper and a chute adapted to deliver material upon the last-named screen and having a foraminous bottom provided with transverse riffles.

In testimony that I claim the foregoing as my own I have hereto affixed my signature in the presence of two witnesses.

RICHARD TUDOR MARSHALL.

Witnesses:
J. W. GOODROE,
R. D. BRUCE.